United States Patent
Sano et al.

(10) Patent No.: US 9,409,085 B2
(45) Date of Patent: Aug. 9, 2016

(54) GAME SYSTEM, GAME CONTROL METHOD, GAME DEVICE, AND COMPUTER-READABLE STORAGE MEDIUM

(71) Applicant: NINTENDO CO., LTD., Kyoto (JP)

(72) Inventors: Tomomi Sano, Kyoto (JP); Toshiharu Izuno, Kyoto (JP); Tomohiro Yamamura, Kyoto (JP); Hiroyuki Takahashi, Tokyo (JP); Shugo Takahashi, Tokyo (JP); Haruki Kodera, Tokyo (JP); Shuji Shimizu, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 40 days.

(21) Appl. No.: 13/710,986

(22) Filed: Dec. 11, 2012

(65) Prior Publication Data

US 2013/0217452 A1    Aug. 22, 2013

(30) Foreign Application Priority Data

Feb. 16, 2012    (JP) .................................. 2012-031651

(51) Int. Cl.
*G06F 19/00*    (2011.01)
*A63F 13/00*    (2014.01)

(52) U.S. Cl.
CPC .............. *A63F 13/005* (2013.01); *A63F 13/00* (2013.01); *A63F 2300/646* (2013.01); *A63F 2300/6653* (2013.01); *A63F 2300/695* (2013.01); *A63F 2300/8011* (2013.01)

(58) Field of Classification Search
CPC ....... A63F 13/04; A63F 13/00; A63F 7/0652; A63F 2003/00318; A63F 2300/6653; G06F 19/00

USPC .......................................................... 345/473
See application file for complete search history.

(56) References Cited

U.S. PATENT DOCUMENTS

| 6,746,331 B1* | 6/2004 | Saikawa et al. ................. 463/31 |
| 2003/0078086 A1* | 4/2003 | Matsuyama et al. ............. 463/3 |

(Continued)

FOREIGN PATENT DOCUMENTS

| EP | 1 892 022 | 2/2008 |
| JP | 2002-049936 | 2/2002 |

(Continued)

OTHER PUBLICATIONS

Document and Partial English Translation of non-patent document: Nintendo Kabushiki Kaisha, "MarioTennis", www.nintendo.co.jp/wii/rmaj/index/html, searched Feb. 7, 2012, 5 pages.
Japanese Office Action issued in Application No. 2012-031651 dated Mar. 15, 2016 (9 pages).

*Primary Examiner* — James S McClellan
*Assistant Examiner* — Syvila Weatherford
(74) *Attorney, Agent, or Firm* — Nixon & Vanderhye P.C.

(57) ABSTRACT

An exemplary embodiment sets the game background image with surface objects (bricks, coins, item closed box baffles, monsters, and the like) arranged therein in the middle of the tennis court within a virtual space for executing a tennis game containing the motion of hitting the tennis ball according to an operation by the player, and scrolls the surface objects arranged in the game background image. Then, there is provided an effect corresponding to the type of the surface object (benefit object, the hit map switching object, scoring object, or the like) arranged in a position of the game background image, where the tennis ball shot in response to a player-operation has reached.

24 Claims, 14 Drawing Sheets

(56) References Cited

U.S. PATENT DOCUMENTS

2005/0176485 A1* 8/2005 Ueshima ................ 463/4
2007/0252779 A1* 11/2007 Nishiyama et al. ........ 345/1.1
2009/0128551 A1* 5/2009 Bakalash et al. ......... 345/419
2013/0088648 A1* 4/2013 Yoon et al. ............. 348/734

FOREIGN PATENT DOCUMENTS

| JP | 2004-097702 | 4/2004 |
| JP | 2008-052374 | 6/2008 |

* cited by examiner

FIG.10
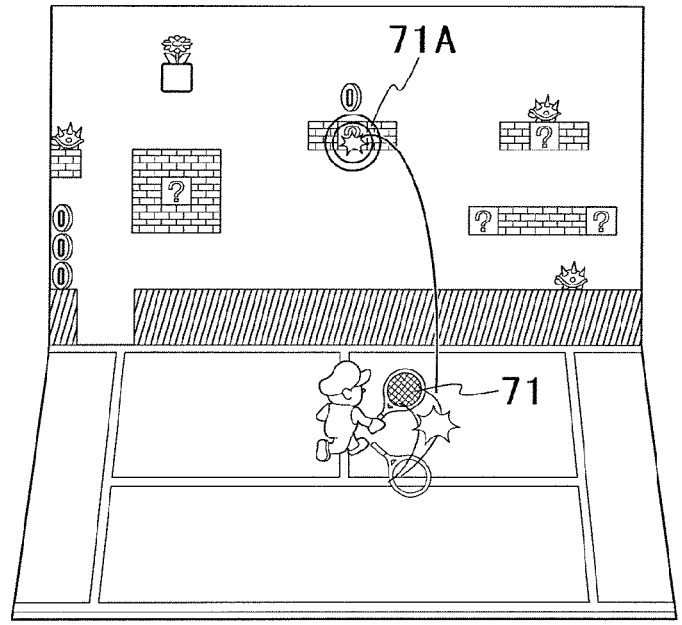
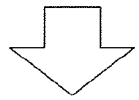
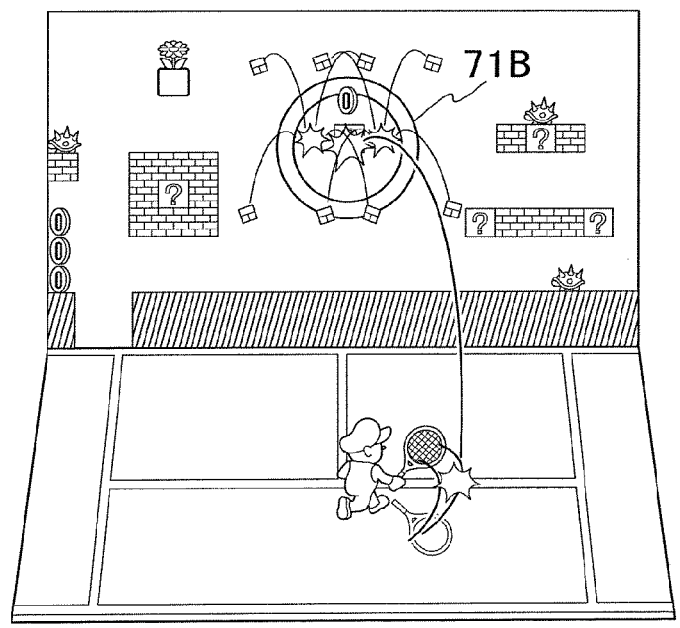

GAME SYSTEM, GAME CONTROL METHOD, GAME DEVICE, AND COMPUTER-READABLE STORAGE MEDIUM

CROSS REFERENCE TO RELATED APPLICATION

The present application claims priority from Japanese Patent Application No. 2012-31651, which was filed on Feb. 16, 2012, the disclosure of which is herein incorporated by reference in its entirety.

FIELD

The technology herein relates to a game system, a game control method, a game device, and a computer-readable storage medium each of which enables execution of a ball game and another game element at the same time within a virtual space.

BACKGROUND AND SUMMARY

For example, as the ball game to be executed in a game device, there has been a tennis game in which a player-controlled character an opponent hit a tennis ball against each other within a tennis court in the virtual space.

Game players tend to wish for a game incorporating therein a new game element.

Under such circumstances, it is an object of the present example to provide a new game system, a game control method, a game device, and a game program which executes a ball game and another game element at the same time within a virtual space.

To achieve the object, the present example has the following characteristics.

An example is a game system configured to execute a ball game within a virtual space. The game system includes: a shot processor configured to execute a process of hitting a ball in response to an operation by a player; a surface setting component configured to set a surface in a predetermined position of the virtual space, where the ball reaches; an object arranger configured to arrange one or more surface objects within the surface; an object processor configured to move, within the surface, at least one of the one or more surface objects arranged within the surface; and an effect processor configured to provide a predetermined effect in the ball game, based on at least one of the one or more surface objects arranged in a position of the ball at a point when the ball reaches the surface.

With this, it is possible to set a surface having at least one of the one or more surface objects arranged thereon in a predetermined position within the virtual space in which a ball game containing the motion of hitting the ball in response to an operation by the player is executed, and move at least one of the one or more surface objects arranged on the surface. Based on the surface object arranged in a position of the surface, where the ball hit in response to an operation by the player has reached, a predetermined effect in the ball game is awarded to the player. Thus, the player of the ball game is able to enjoy an additional game element which is to aim at a predetermined effect awarded by the moving surface objects arranged on the surface while playing the ball game within the virtual space.

The game system may further include a bounce-back processor configured to execute a process of bouncing back the ball when the ball reaches the surface.

With this, when the ball reaches the surface having the surface objects arranged thereon in the ball game within the virtual space, the ball is bounced back. Since the ball having reached the surface after being hit by an operation by the player bounces back on the surface, the player repetitively hit the ball, which consequently provides enjoyment of the ball game.

Further in the game system, the ball game is a ball game to compete against an opponent within a court in the virtual space; and the surface is set in the middle of the court and is capable of letting pass the ball therethrough.

With this, it is possible to arrange a surface between the player and the opponent during a game within the court in the virtual space, the surface having moveable surface objects arranged thereon and letting the ball pass therethrough. This enables the player and the opponent to enjoy the ball game in which the player and the opponent hit the ball against each other over the surface with the moveable surface objects arranged thereon.

Further, the game system may further include a transparency processor configured to raise the transparency of at least a part of the surface when the ball is within a court on a side of the opponent.

With this, the transparency of at least a part of the surface is made higher when the ball is in the court of the opponent side, as compared with the cases where the ball is in the court of the player side. Since this enables the player of the ball game to grasp the movement of the opponent or the position of the ball through the surface with an increased transparency while the ball is in the court of the opponent side, the player is able to smoothly conduct the next operation.

Further, in the game system, the ball game is a tennis game.

With this the, the ball game executed in the virtual space is enjoyed as a tennis game. Specifically, the ball serves as the tennis ball, the tool for hitting the tennis ball in response to an operation by the player is a racket, and the court serves as the tennis court, and the surface is arranged nearby the net.

Further, the effect processor may execute a process of awarding the player an item and/or a process of awarding the player a score, when at least one of the surface objects arranged in a position of the surface where the ball reaches is a predetermined item object.

Further, with the above structure, when a surface object arranged in a position of the surface where the ball reached corresponds to a predetermined item object, the player is able to obtain a predetermined item or a score. This provides various developments of the game by awarding the player various benefits based on the item or the score obtained by the player.

Further, the game system may further include a plurality of maps including the surface objects, and the effect processor may switch over at least one of the maps to another one of the maps, when at least one of the surface objects arranged in a position where the ball reached is a predetermined type of surface object.

With this, the map is switched over to another map when the surface object arranged in a position of the surface where the ball reached is a predetermined type of surface object. This enables the player to enjoy the ball game with various maps.

Further, the object processor may scroll over time at least one of the one or more surface objects arranged within the surface.

With this, the surface objects arranged on the surface are scrolled over time. Thus, for example, in cases of adopting a structure in which the surface objects are successively supplied by scrolling, the player is able to hit the ball, aiming at the surface objects successively supplied by scrolling. In other words, new surface objects are always provided to the player.

Further, another example is a game system configured to execute a game within a first virtual space. The game system may include: a target processor configured to control an operation target within the first virtual space, based on an operation by a player; a screen setting component configured to set a screen area in a predetermined position within the first virtual space; a second virtual space setting component configured to set a second virtual space which is different from the first virtual space; a second virtual space drawing component configured to display on the screen area a part of the second virtual space while enabling movement of the part of the second virtual space; and an effect processor configured to provide a predetermined effect in the game, in relation to a position of the second virtual space corresponding to the position of the operation target at a point when the operation target moving within the first virtual space reaches the screen area.

With this, it is possible to set a screen area in a predetermined position within the first virtual space in which an operation target is controlled in response to an operation by the player, and display on the set screen area a part of a second virtual space which is different from the first virtual space. In relation to the position of the second virtual space corresponding to the position of the operation target when the operation target moving within the first virtual space in response to an operation by the player reaches the screen area, a predetermined effect in the game is awarded to the player. Thus, the player of the game is able to enjoy an additional game element which is to aim at a predetermined effect awarded in relation to the second virtual space while playing the game within the first virtual space.

Further, the above described examples of technology herein may be implemented in the forms of game control method, game device, and game program in addition to the form of game system.

With the present example, there is provided a new game system, a game control method, a game device, and a game program which execute a ball game and another game element at the same time within a virtual space.

BRIEF DESCRIPTION OF THE DRAWINGS

FIG. 10 shows an example non-limiting diagram of an effect corresponding to a benefit object in the item/score process.

DETAILED DESCRIPTION OF NON-LIMITING EXAMPLE EMBODIMENTS (Embodiment)

The following describes a game system 1 related to the present embodiment with reference to the drawings.

(Structure of Game System 1)

Figure 1:
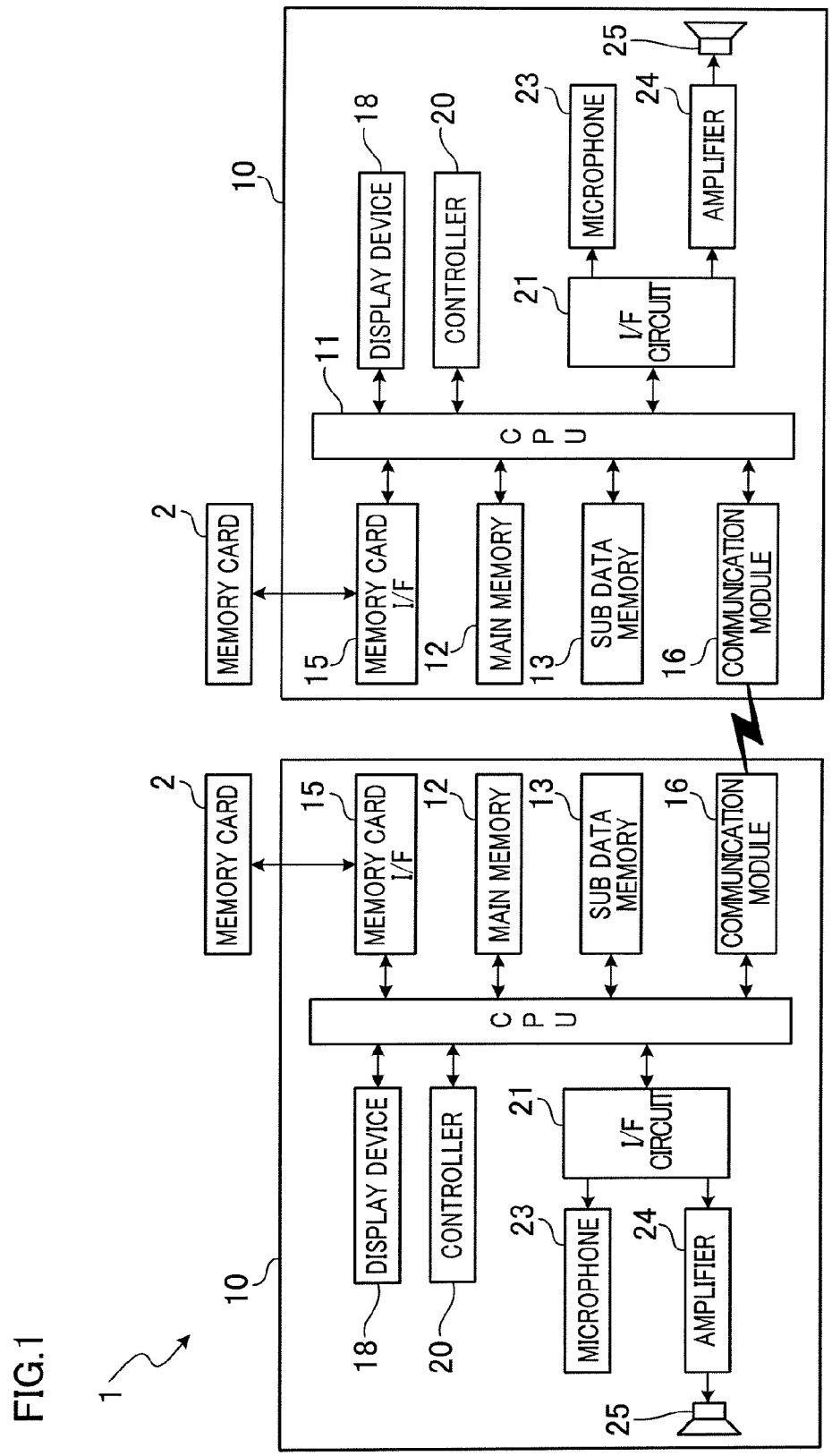
FIG. 1 shows an example non-limiting block diagram of a game system and a game device related to the present embodiment.

As shown in the block diagram of FIG. 1, the game system 1 includes a plurality of portable game devices 10.

The present embodiment deals with a case where the game system 1 includes two game devices 10; however, the system may include three or more game devices 10. In the game system 1, the game devices 10 are connected to each other and are capable of conducting wireless communication. It is assumed that a plurality of players each use one game device 10.

It should be noted that, in the game system 1 of the present embodiment, the game devices 10 are connected to each other via wireless communication; however, the system is not limited to this, and the game devices 10 maybe connected to each other via a network such as the internet.

Further, each game device 10 is structured so that a player is able to play a game alone (in the off-line mode).

(Structure of Game Device 10)

Next, the following describes the structure of the game device 10 constituting the game system 1, with reference to FIG. 1.

The game device 10 includes: a CPU 11, a main memory 12, a sub data memory 13, a memory card interface (memory card I/F) 15, a communication module 16, a display device 18, a controller 20, and an interface circuit (I/F circuit) 21.

The CPU 11 is connected, via not-shown buses, to the main memory 12, the sub data memory 13, the memory card I/F 15, the communication module 16, the display device 18, the controller 20, the I/F circuit 21, and the like.

The CPU 11 executes a predetermined process by running a predetermined program. For example, the CPU 11 runs a later-described tennis game program and a later-described wall-hitting tennis game program. The main memory 12 functions as a work area for the CPU 11. In other words, the main memory 12 stores therein: a predetermined program or information data obtained by the CPU 11, from the outside via the memory card I/F 15, the communication module 16, and the like; and various data obtained through a predetermined process. For example, PSRAM (Pseudo-SRAM) is adoptable as this main memory 12.

The sub data memory 13 is a rewritable and nonvolatile memory. As the sub data memory 13, for example a NAND flash memory is adoptable. In this sub data memory 13 are stored a program for booting the game device 10 and various parameters, or the like.

To the memory card I/F 15 is detachably connected the memory card 2. To and from this memory card 2, the memory card I/F 15 writes and reads data according to instructions from the CPU 11.

The communication module 16 has a function of conducting wireless communication with another game device 10, in compliance with a communication standard of IEEE802.11b/g, or the like. Note that the game device 10 may conduct wired communication with another game device 10, in place of or in addition to the wireless communication.

For example, the display device 18 is a liquid crystal display device having a liquid crystal display. The display device 18 in the present embodiment displays a game image of a tennis game carried out within a virtual space 60 (three-dimensional virtual space).

The controller 20 has one or more operation components which receives an operation by a player. For example, the controller 20 has a cross button, a start button, a select button, a confirm button, a cancel button, and further includes a touch panel which outputs signals to the I/F circuit 21 based on a touch operation by the player. The touch panel may be any given touch panel such as a resistive membrane panel, an optical touch panel (infrared touch panel), and a capacitive touch panel.

Further, the game device 10 has a microphone 23, an amplifier 24, and a speaker 25, and the microphone 23 and the amplifier 24 are connected to the I/F circuit 21.

The I/F circuit 21 includes an audio control circuit for controlling the microphone 23 and the amplifier 24. The audio control circuit performs A/D conversion to audio signals from the microphone 23, based on an instruction from the CPU 11, and outputs the converted signals to the CPU 11. Further, based on the instruction from the CPU 11, the audio control circuit executes predetermined audio signal processing, followed by D/A conversion, to audio data input by the CPU 11, and then outputs the converted audio data to the amplifier 24 to output a sound from the speaker 25.

The microphone 23 collects sound and outputs audio signals based on the collected sound to the I/F circuit 21. The amplifier 24 connects to the speaker 25, amplifies the audio signals input via the I/F circuit 21, and outputs the amplified signals to the speaker 25. The speaker 25 outputs sound input from the amplifier 24.

(Overview of Process for Setting Two-dimensional Virtual Space in Three-dimensional Virtual Space)

The following describes with reference to FIG. 7 to FIG. 9, and FIG. 11, an overview of a process for setting a two-dimensional virtual space in a three-dimensional virtual space 60, which is executed by the game device 10.

The process for setting the two-dimensional virtual space in the three-dimensional virtual space 60 is executed in a later-described tennis game process. In the present embodiment, the game device 10 executes a tennis game in which an operation character 70 and an opponent character 73 compete against each other by alternately hitting a tennis ball 72 in a three-dimensional virtual space 60 (first virtual space). The operation character 70 is a character which moves in response to an operation by a player, and the opponent character 73 is a character which moves automatically or in response to an operation by another player, i.e., a communication partner.

In the virtual space 60 are arranged a tennis court 61 having an opponent character 73 side court and an operation character 70 side court, and a surface is set between the opponent character 73 side court and the operation character 70 side court. The expression "surface is set" means for example to arrange, in the three-dimensional virtual space 60, an object (wall object 59 in the present embodiment: see FIG. 7) having a surface on which a game background image 63 is pasted and which has surface objects. Then, a process for pasting the game background image 63 on the surface of the wall object 59 is executed. Although the present embodiment deals with a case where the surface is a flat plane, it is possible to adopt a curved surface. Note that an object having a flat plane is not limited to a wall object 59, and may be any type of object (e.g., a plate polygon, or the like).

On the flat plane of the wall object 59 are arranged a plurality of surface objects each overlapped with the game background image 63. These surface objects are two-dimensional objects having no thickness, and there are a plurality of types of these objects. The game background image 63 and the surface objects constitute a two-dimensional virtual space corresponding to the "second virtual space" of the present example. Hitting the surface object with the tennis ball 72 causes a predetermined game effect in the three-dimensional virtual space 60. For example, the predetermined game effect is occurrence of a predetermined item as a new surface object or awarding of an item to the player. Further, for example, the predetermined game effect is switching over of the game background image 63 on the flat plane of the wall object 59 to another game background image 63 and changes in arrangement positions of the surface objects in the game background image 63. The switching over of the game background image 63 on the wall object 59 and changing the surface objects corresponding to the game background image 63 switched over are expressed as "map switchover".

Figure 11:
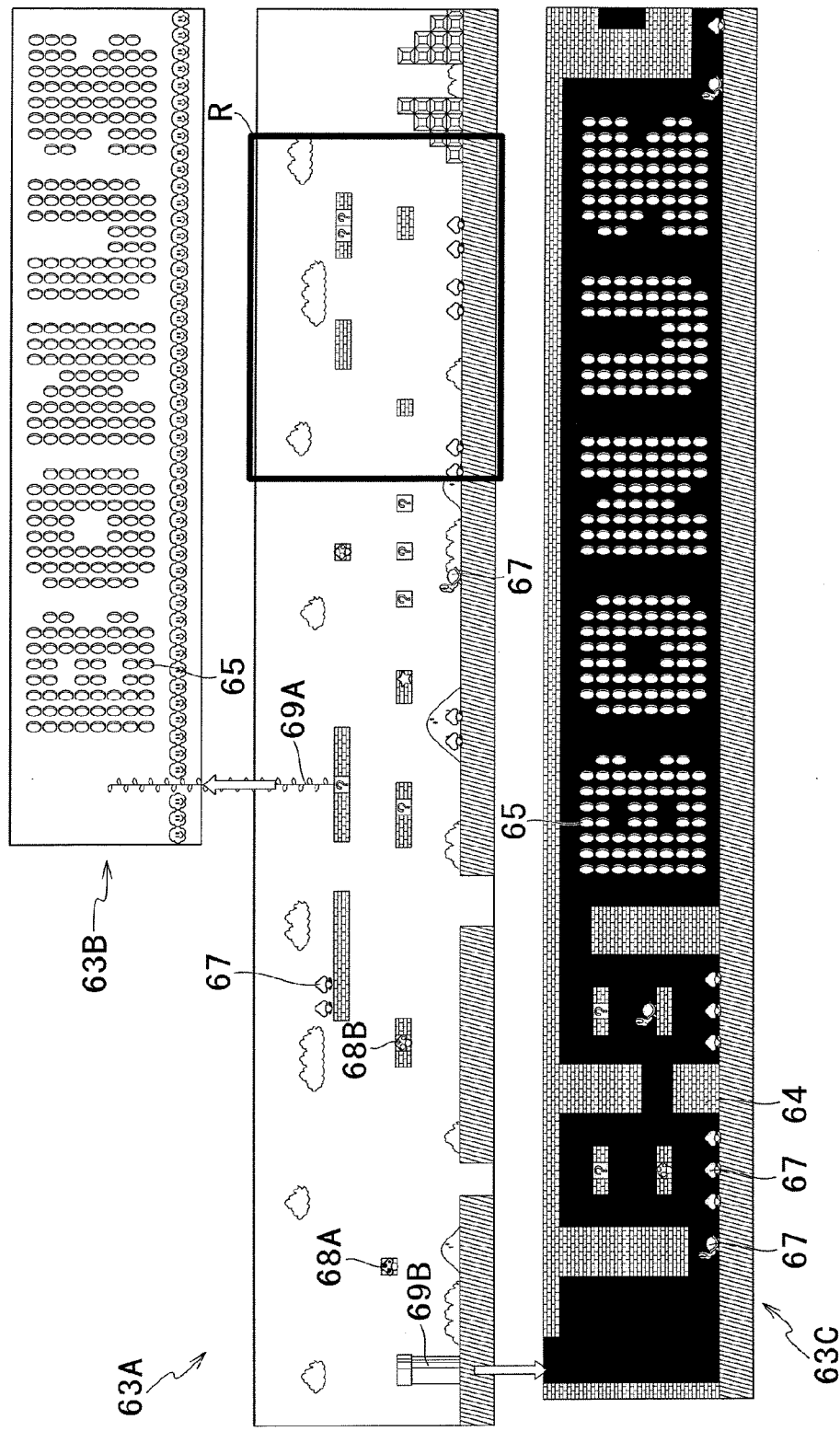
FIG. 11 shows an example non-limiting diagram of a ground map, a sky map, an underground map related to the present embodiment.

This "map switchover" is specifically described. For example, as shown in FIG. 11, there are a plurality of game background images 63 (63A, 63B, 63C), and one of them is pasted on the surface of the wall object 59. These game background images 63 are different maps (ground map 63A, sky map 63B, underground map 63C). For example, suppose the game background image 63 corresponding to the ground map 63A (the game background image 63 in the middle of the figure) is pasted on the surface of the wall object 59. In this case, when the tennis ball 72 hits a predetermined item object (pea plant 69A, earthen pipe 69B), the game background image 63B corresponding to the sky map 63B or the game background image 63C corresponding to the underground map 63C replaces the game background image 63 on the wall object 59. Further, switching over of the map also changes the surface objects corresponding to the type of the game background image 63.

Figure 7:
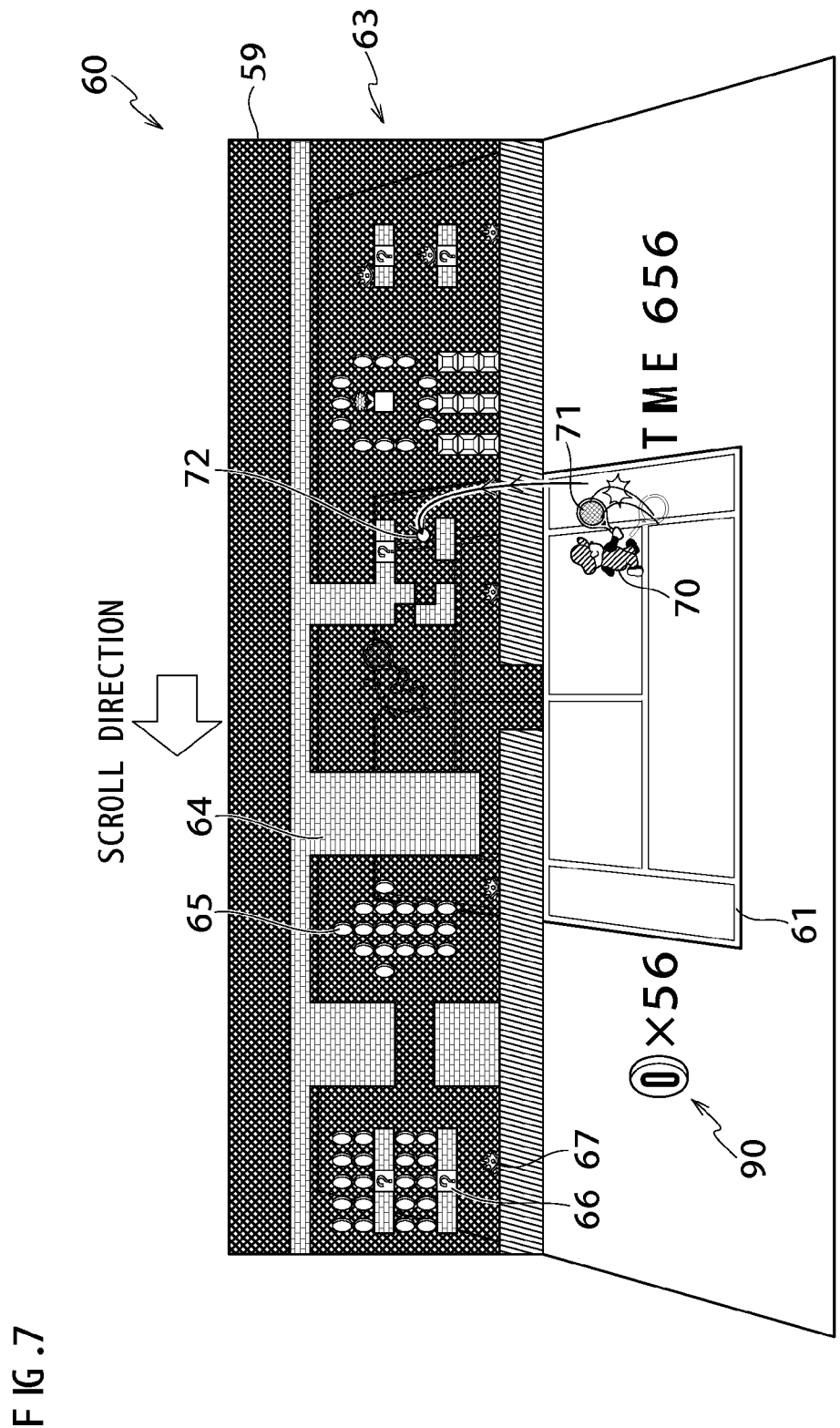
FIG. 7 shows an example non-limiting first explanatory diagram of a game image displayed on a display device.
Figure 8:
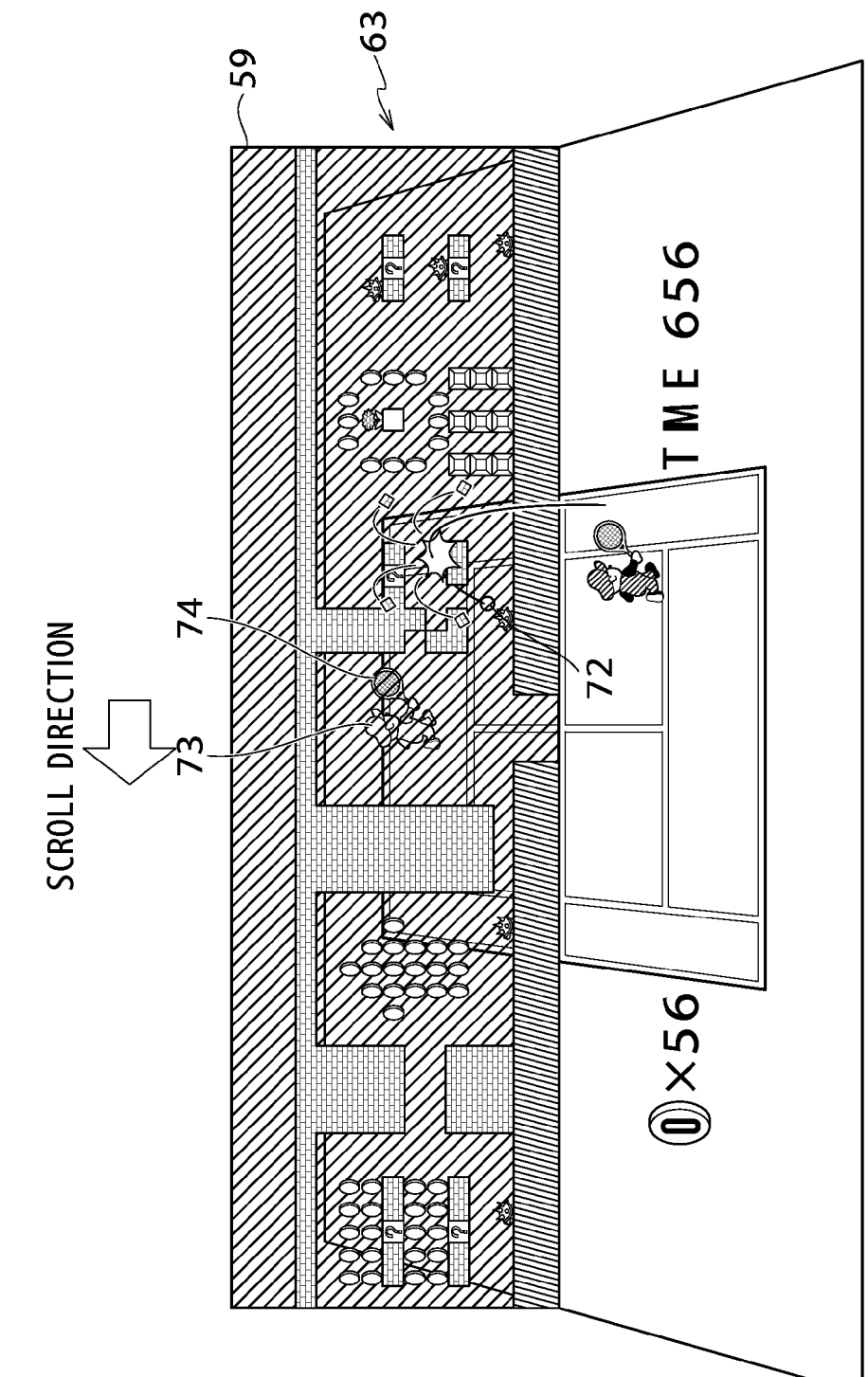
FIG. 8 shows an example non-limiting second explanatory diagram of a game image displayed on the display device.
Figure 9:
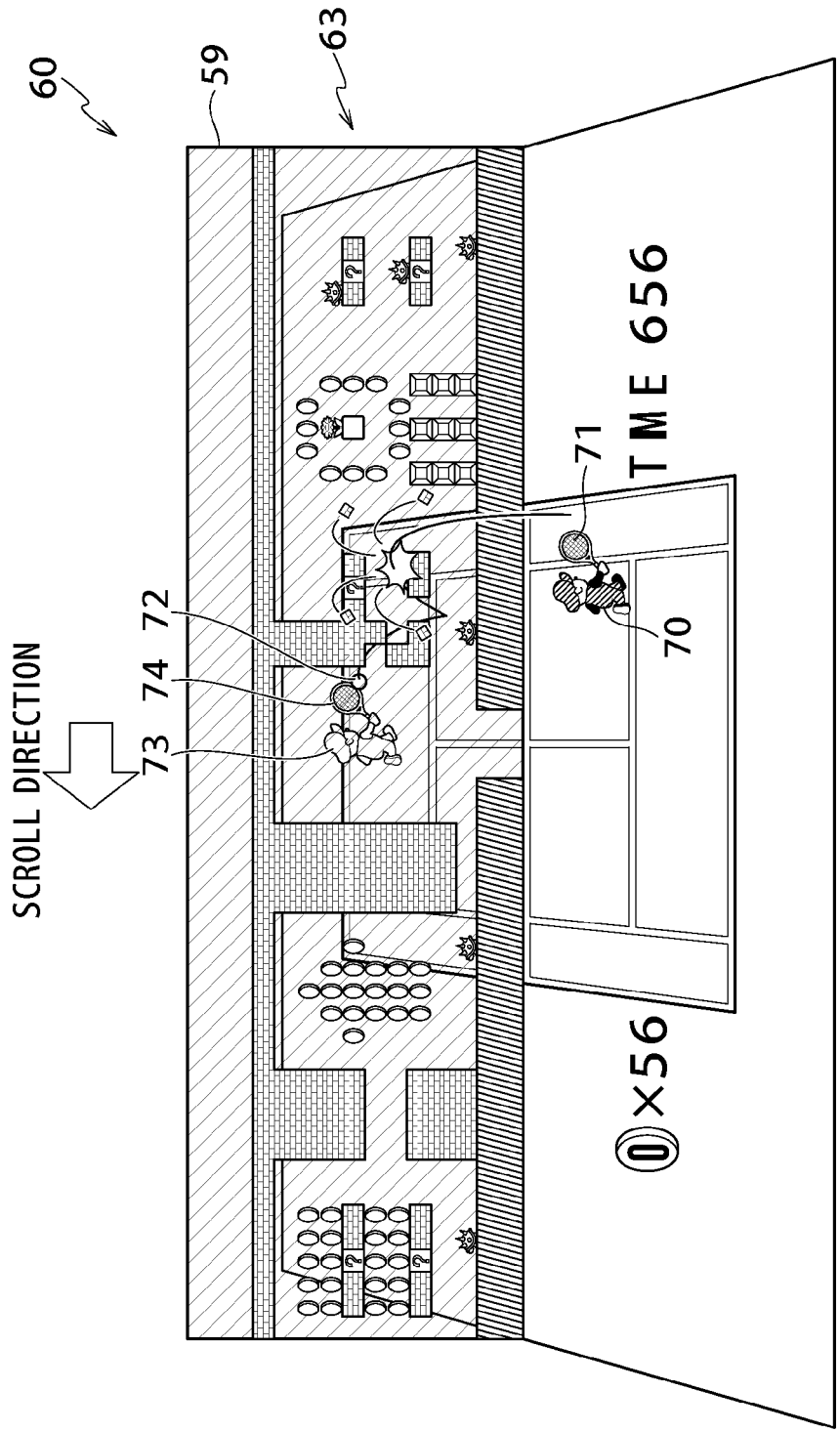
FIG. 9 shows an example non-limiting third explanatory diagram of a game image displayed on the display device.

Meanwhile, in the virtual space 60, there is executed a process (scroll process) for scrolling the game background image 63 and the surface objects (from the right towards left in FIG. 7 to FIG. 9). The following describes this scroll process. As shown in FIG. 11, the game background image 63 as a whole has a size larger than a pasting region R on the flat plane of the wall object 59. This pasting region R moves (slides) within the game background image 63 in a constant direction (from left to right in FIG. 11) by a constant amount per unit time. This enables the player to see the game background image 63 moving in the sliding direction (from the right to left in figures) as shown in FIG. 7 and FIG. 8. The arrangement positions of the surface objects are also moved by a constant amount per unit time in the constant direction (from right to left in the figure). This is viewed by the player as the surface objects also scrolling along with the game background image 63.

It should be noted that, in the following description, the wording "virtual space" means the "three-dimensional virtual space", and not the "two-dimensional virtual space".

(Memory Map of Main Memory 12)

Figure 2:
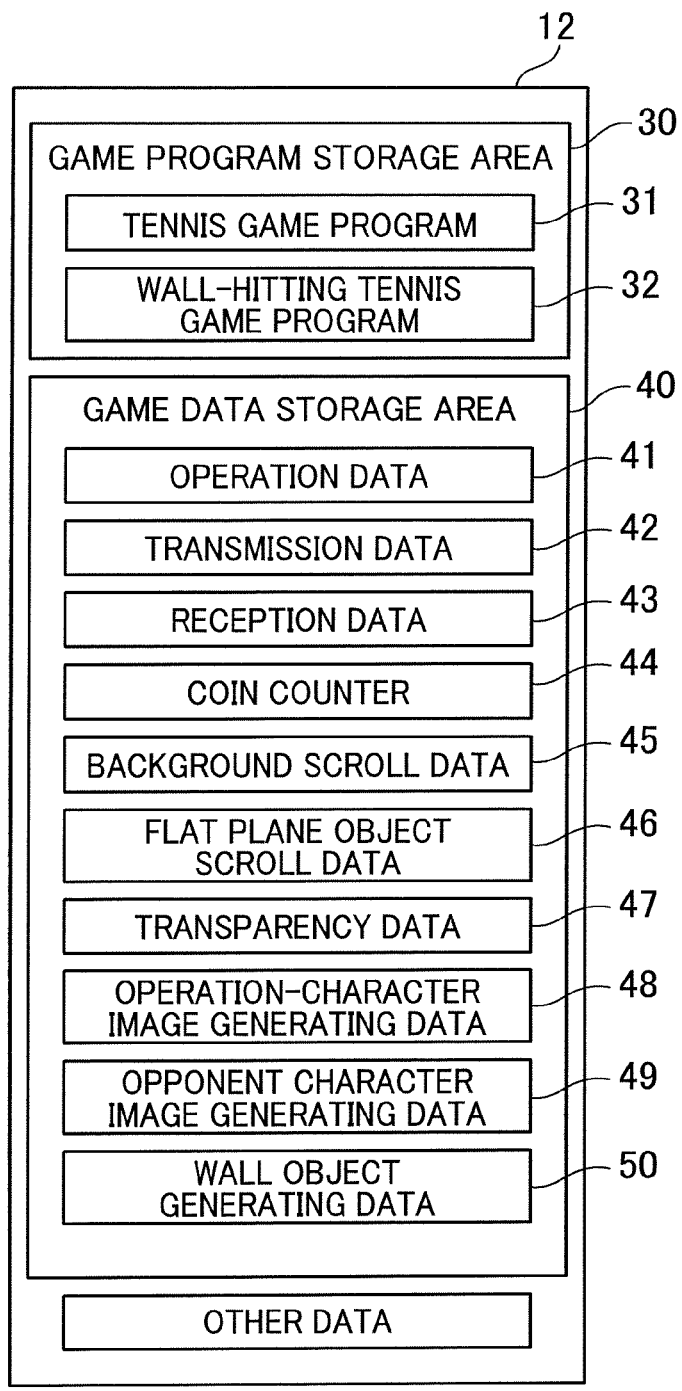
FIG. 2 shows an example non-limiting explanatory diagram of a memory map of a main memory related to the present embodiment.

Next, the following describes programs and data stored in the main memory 12. As shown in FIG. 2, the main memory 12 has a game program storage area 30 and a game data storage area 40.

In the game program storage area 30 are contained a tennis game program 31, a wall-hitting tennis game program 32, or the like. The tennis game program 31 is a program for executing the later-described tennis game process. The wall-hitting tennis game program 32 is a program for executing a later-described wall-hitting tennis game process. The tennis game program 31 and the wall-hitting tennis game program 32 are read out from the memory card 2 shown in FIG. 1, and is stored in the main memory 12. Needless to mention that the tennis game program 31 and the wall-hitting tennis game program 32 may be downloaded from a server or another game device 10 via a communication module 16, and then stored in the main memory 12.

On the other hand, in the game data storage area 40 are contained operation data 41, transmission data 42, reception data 43, a coin counter 44, background scroll data 45, surface object scroll data 46, transparency data 47, operation-character image generating data 48, opponent character image generating data 49, wall object generating data 50, and the like.

The operation data 41 indicates information regarding an input of operation to the controller 20 of the game device 10. The operation data 41 indicates, for example, an operation status of each button of the controller 20 (indicates whether the button is pressed or not). The transmission data 42 is information data to be transmitted from the game device 10 to another game device 10. The reception data 43 is information data having been transmitted from the other game device 10 to the game device 10. The content of the reception data 43 is updated every time the information data is received from the other game device 10. The coin counter 44 counts the number of coins 65 acquired.

The background scroll data 45 is information indicating the moving direction of the game background image 63 and an amount moved in a unit time (e.g. 1/60 sec) of the game background image 63. The surface object scroll data 46 is information indicating the moving direction of the surface objects and an amount moved in a unit time (e.g., 1/60 sec) of the surface objects. The transparency data 47 indicates the transparency of the arrangement area of the game background image 63 on the wall object 59 and the surface objects. The operation-character image generating data 48 is for generating an image of the operation character 70, and indicates the position, the direction, the posture (motion), and the like of the operation character 70. The opponent character image generating data 49 is for generating the opponent character 73, and indicates the position, the direction, the posture (motion), and the like of the opponent character 73. The wall object generating data 50 is for generating an image of the wall object 59, and indicates the position of the wall object 59, a read-out position of the game background image 63 (the region to be pasted on the wall object 59), and the coordinates (local coordinates) of the surface objects.

In addition to the above, the main memory 12 stores data needed for displaying a game image of the tennis game such as: data of a plurality of types of surface object images, data of a plurality of types of game background images 63, initial position information of surface objects corresponding to the plurality of types of the game background images 63, polygon models, textures, and the like.

(Processes Executed)

Next, the following describes a processes executed in the game device 10.

(Tennis Game Process)

Figure 3:
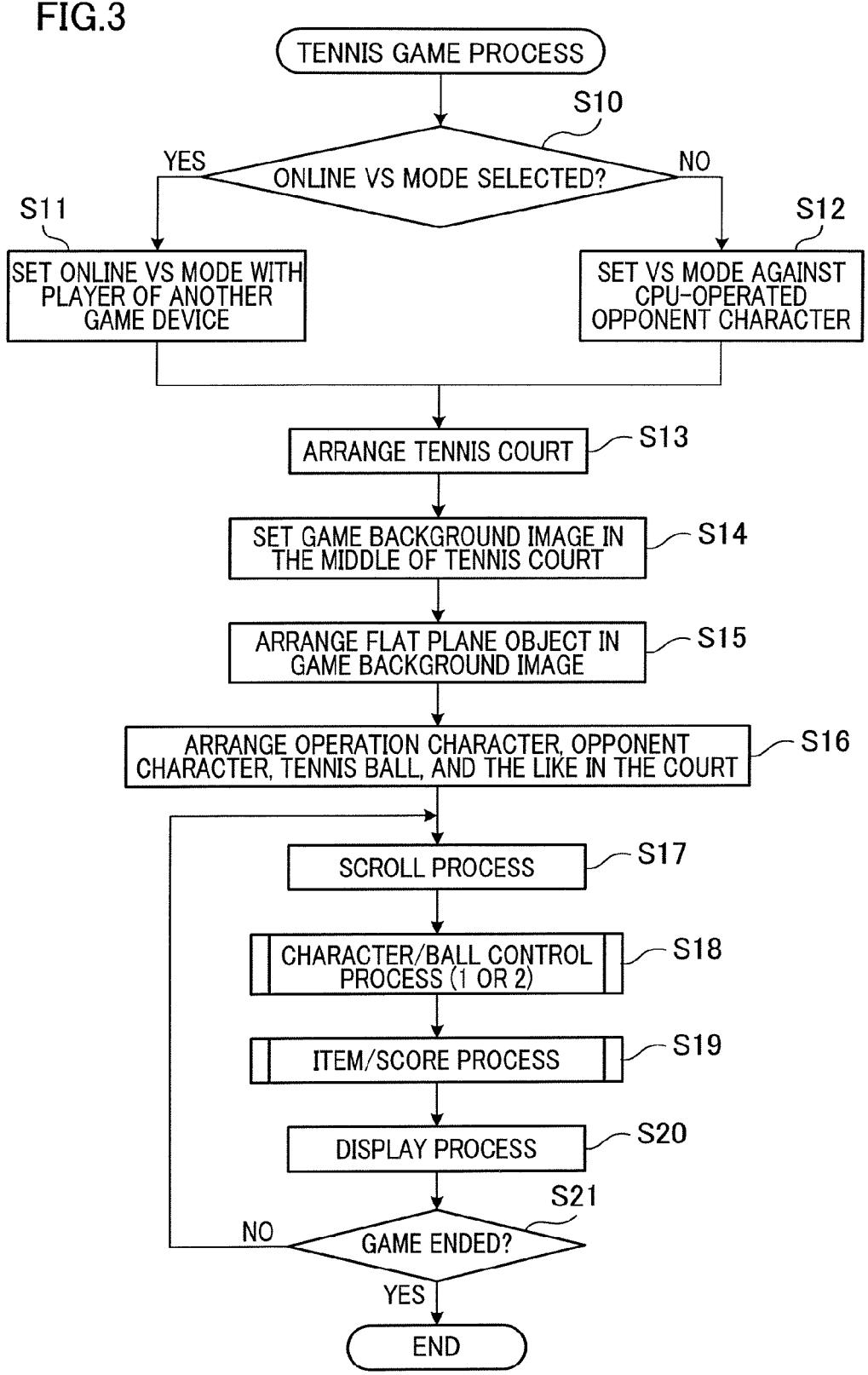
FIG. 3 shows an example non-limiting flowchart of a tennis game process related to the present embodiment

First, with reference to the flowchart of FIG. 3, the following describes a tennis game process executed in the game device 10(CPU 11).

The tennis game process is executed by running a tennis game program.

When starting of the tennis game process is instructed by the player, the tennis game program is run to cause the CPU 11 to execute the following steps. First, the CPU 11 determines whether there is a reception of a player-selection of an online VS-mode which enables online competition between the player and another game device 10 (S10). When it is determined that the player-selection of the online VS-mode is received (S10: YES), the CPU 11 establishes communication with the other game device 10, and sets the online VS-mode (S11). This enables the player to compete against an opponent character 73 which is controlled by the player of the communication partner game device 10.

On the other hand, when there is no reception of the player-selection of the online VS-mode (S10: NO), the CPU 11 sets a VS mode in which the player compete against an automatically-operated opponent character 73 (S12).

After step S11 or S12, the CPU 11 arranges a tennis court 61 within a virtual space 60 (S13).

Next, the CPU 11 arranges a wall object 59 in the middle of the tennis court 61, and sets on the surface of the wall object 59 a game background image 63 (corresponding to the surface) (S14). The present embodiment adopts as the game background image 63: a game background image 63A shown in the middle of FIG. 11 which includes the ground, mountains, bushes, and clouds; a game background image 63B shown in the upper part of FIG. 11 which renders an image of the sky scene; a dark game background image 63C shown in the lower part of FIG. 11 which renders an image of the underground scene. Note that the CPU 11 functions as a surface setting component in step S14.

Next, the CPU 11 arranges within the game background image 63 various types of surface objects (bricks 64, coins 65, item closed box baffles 66, monsters 67, and the like) (S15). The surface objects include a fixed object whose arrangement position within the game background image 63 does not change; a moveable object capable of individually moving (changing the arrangement position in the game background image 63); and an item object which gives a predetermined effect to the player. Examples of the fixed object include: bricks 64, item closed box baffles 66, or the like. Examples of the moveable object include a monster 67, and examples of the item object includes: a benefit object 68 (mushroom 68A, mushroom 68B), a map switching object 69(pea plant 69A, earthen pipe 69B), a scoring object (coins 65 or the like). Further, in step S15 executed by the CPU 11, the CPU 11 functions as an object arranger.

Next, the CPU 11 arranges in the tennis court 61 an operation character 70 operated by the player of the game device 10; an opponent character 73 controlled by an online opponent or by the CPU; a tennis ball 72; rackets 71, 74, and the like (S16). As described, initial setting (building of the virtual space) of the tennis game is executed through S13 to S16.

The CPU 11 then repeats processes from the later-described S17 to S21 at every predetermined drawing cycle.

First, the CPU 11 executes the above described scroll process (S17). Specifically, as shown in FIG. 9, a process is executed by which the game background image 63 and the surface objects appear in the eyes of the player to move from the right side to the left side over the time. Note that in step S17 by the CPU 11, the CPU 11 functions as a motion processor.

Next, the CPU 11 executes a later-described character/ball control process (S18). Then, a later-described item/score process is executed (S19).

Next, a game image is generated based on the result of steps S17 to S19, and is displayed on the display device 18 (S20).

Next, the CPU 11 determines whether a termination condition of the tennis game is satisfied (S21). When it is determined that the termination condition of the tennis game is satisfied (S21: YES), the CPU 11 ends the process. On the other hand, when it is determined that the termination condition of the tennis game is not satisfied (S21: NO), the CPU 11 causes the process to return to step S17. For example, the termination condition of the tennis game may be: mistakenly letting the tennis ball 72 go behind; or letting the tennis ball 72 bounce twice within the court before sending back the tennis ball 72 to the court of the opponent.

(Character/Ball Control Process 1)

Figure 4:
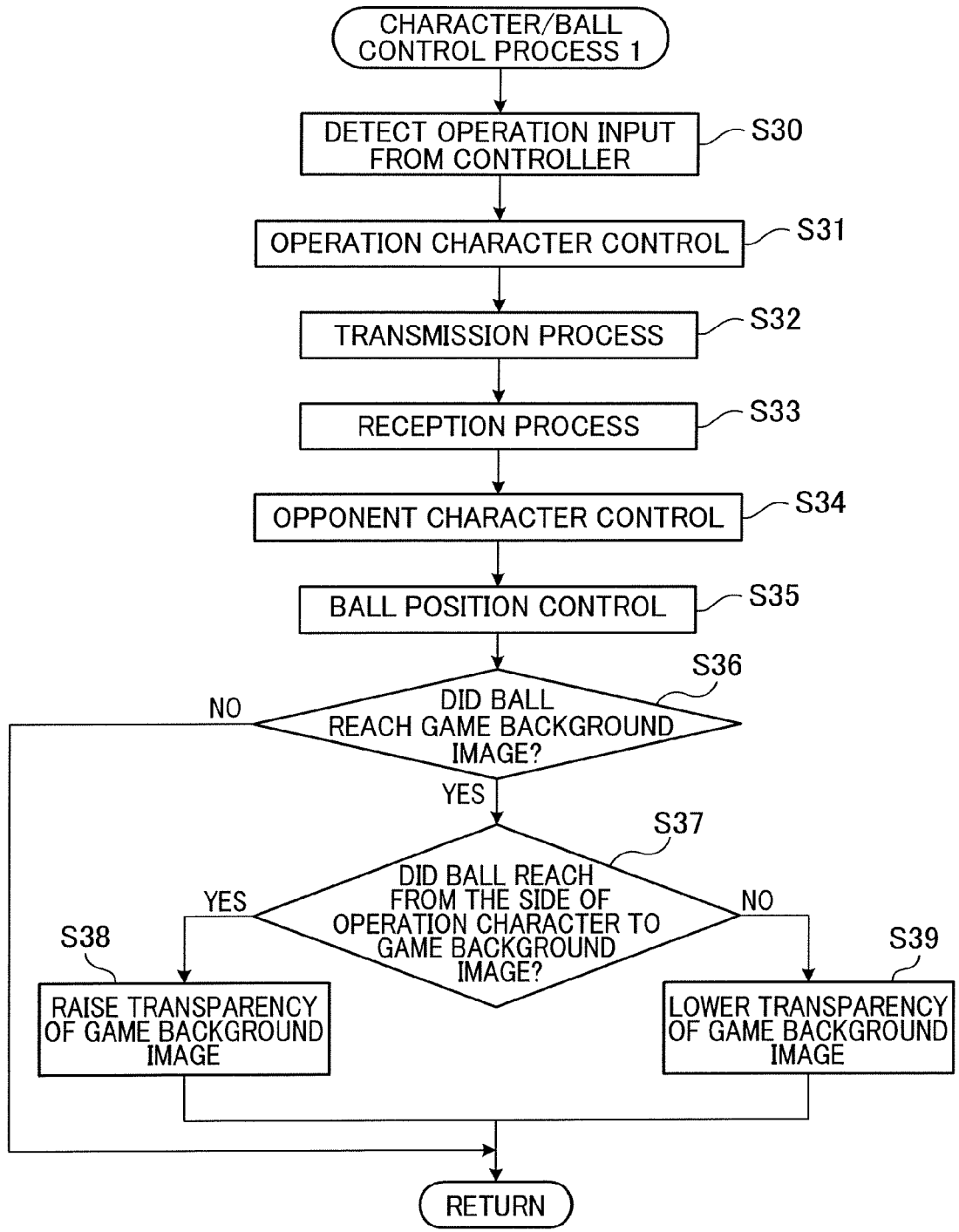
FIG. 4 shows an example non-limiting flowchart of a character/ball control process 1 of the present embodiment.

Next, with reference to the flowchart of FIG. 4, the following describes a character/ball control process 1 executed in the tennis game process (S18). The character/ball control process 1 is a process executed in cases where the online VS-mode (S11) is set in the tennis game process.

First, the CPU 11 detects an operation input from the controller 20 (S30). Next, based on the operation input detected in step S30, the CPU 11 controls the position, the direction, and the motion (posture) of the operation character 70 (S31). Specifically, when the operation input is to move the operation character 70, the operation character 70 is moved to a designated position. When the operation input is for causing the operation character 70 to hit the tennis ball 72, the racket 71 is swung. If the racket 71 hit the tennis ball 72, the moving direction and the speed of the tennis ball 72 are changed. Then, the tennis ball 72 is moved, based on the moving direction and the speed set for the tennis ball 72. The information data generated in the motion control in step S31, such as the position data of the operation character 70, the swing motion data of the racket 71, data of the moving direction and speed of the tennis ball 72 hit by the operation character 70 with the racket 71, and data generated based on the operation input by the player, is stored in the main memory 12 as the transmission data. Note that the moving direction and the speed of the tennis ball 72 may be changed every time the tennis ball 72 hit the tennis court 61, the net or the surface object. Further, the step S31 executed by the CPU 11 corresponds to the shot processor.

Next, the CPU 11 executes a transmission process (S32). Specifically, the CPU 11 transmits the information data stored as the transmission data 43 in step S31 to the online opponent.

Next, the CPU 11 executes a reception process (S33). Specifically, the CPU 11 checks whether information data is received from the other game device 10. When the information data is received, the information data received is stored as the reception data 43 in the main memory 12. This reception data 43 contains the position data, the motion data of the opponent character 73; the data of the position, the moving direction, and the speed of the tennis ball 72; and other data generated based on an operation input by the player.

Next, the CPU 11 controls the position, the direction, and the motion (posture) of the opponent character 73, based on the information data stored as the reception data 43 in the main memory 12 in step S33 (S34). This causes the opponent character 73 to move or make the motion of swinging the racket 74.

Further, the CPU 11 controls the position of the tennis ball 72 (S35). For example, when the tennis ball 72 hit the racket 74 of the opponent character 73, the CPU changes the moving direction and the speed of the tennis ball 72, and controls the position of the tennis ball 72 in the virtual space 60 based on the moving direction and the speed having been changed.

Next, the CPU 11 determines whether the tennis ball 72 hit back by the operation character 70 or the opponent character 73 reached an arrangement position of the game background image 63 (position in the surface of the wall object 59) displayed as a two-dimensional surface in the middle of the tennis court 61 (S36).

When it is determined that the tennis ball 72 did not reach the arrangement position of the game background image 63 (S36: NO), the CPU 11 ends the process. On the other hand, when it is determined that the tennis ball 72 reached the arrangement position of the game background image 63 (S36: YES), the CPU 11 determines whether the tennis ball 72 came from the side of the operation character 70 to the game background image 63, based on the moving direction of the tennis ball 72 at the time of reaching the arrangement position of the game background image 63 (S37).

When it is determined that the tennis ball 72 came from the side of the operation character 70 to the arrangement position of the game background image 63 (S37: YES), a process of raising the transparency of the game background image 63 is executed (S38). Specifically, the region of the wall object 59 having therein the game background image 63 is semi-transparent so that the objects or the like (opponent character 73 or the like) behind the wall object 59 are also visible by the player. Then, as shown in FIG. 7, when the tennis ball 72 reaches from the side of the operation character 70 to the game background image 63, the transparency of the game background image 63 is raised so as to raise the visibility of the tennis court 61 and the opponent character 73 on the side of the opponent character 73. Note that, after this, the transparency of the game background image 63 is set so as to increase in stepwise, taking a several frames, as shown in FIG. 8 and FIG. 9.

With the process for raising the transparency of the game background image 63, the player of the operation character 70 is able to concentrate on operation for aiming at a surface object the player wish to hit, because the opponent character 73 and the tennis court 61 on the side of the opponent character 73 are hardly visible while the tennis ball 72 is in the tennis court 61 on the side of the operation character 70. Meanwhile, while the tennis ball 72 is in the tennis court 61 on the side of the opponent character 73, the player of the operation character 70 needs to grasp the position and movement of the opponent character 73 and the position of the tennis ball 72, in order to respond to the tennis ball 72 hit back by the opponent character 73. To this end, the transparency of the game background image 63 is raised so that the player is able to grasp the position and the movement of the opponent character 73 and the position of the tennis ball 72 through the game background image 63 with an increased transparency.

In the above process of raising the transparency of the game background image 63, the transparency is raised when the tennis ball 72 reaches the game background image 63; however, the transparency of the game background image 63 may be raised when the operation character 70 hit the tennis ball 72 with the racket 71. Further, for example, it is possible to set the opponent character 73, an endline of the tennis court 61, or the game background image 63 as a reference object, and change the transparency of the game background image 63 according to the distance between the reference object and the tennis ball 72. Further, in the process of raising the transparency of the game background image 63, the transparency of the game background image 63 is gradually raised from a point when the tennis ball 72 reaches the game background image 63 to a point when the opponent character 73 hit back the tennis ball 72; however, the transparency of the game background image 63 may be maximized at a point where the tennis ball 72 reaches a predetermined position such as the game background image 63.

The process ends after step S37.

On the other hand, when it is determined that the tennis ball 72 did not reach from the side of the operation character 70 to the game background image 63 (S37: NO), i.e., when it is determined that the tennis ball 72 reaches from the side of the opponent character 73 to the game background image 63, a process of lowering the transparency of the game background image 63 is executed (S39). This process of lowering the transparency is a process opposite to the process of raising the transparency. Specifically, as shown in FIG. 9, while the tennis ball 72 is on the side of the opponent character 73, the transparency of the game background image 63 is high, and the tennis court 61 on the side of the opponent character 73 and the opponent character 73 are highly visible. When the tennis ball 72 reaches the arrangement position of the game background image 63, the visibility of the game background image 63 is raised (the transparency of the game background image 63 is lowered), as shown in FIG. 8. Note that, after this, the transparency of the game background image 63 is set so as to drop in stepwise, taking a several frames.

The process ends after step S38.

(Character/Ball Control Process 2)

Figure 5:
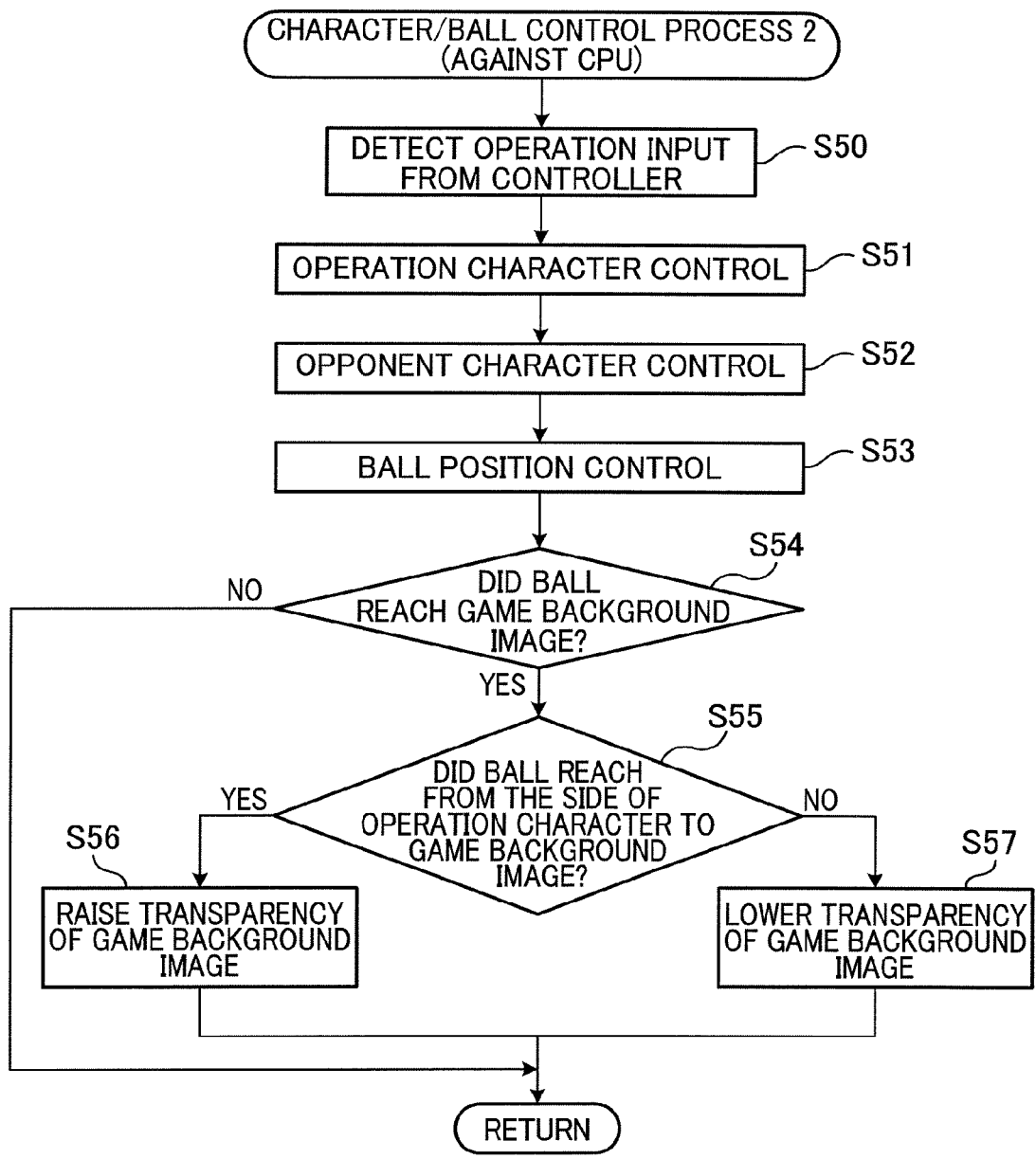
FIG. 5 shows an example non-limiting flowchart of a character/ball control process 2 (vs. CPU) of the present embodiment.

Next, with reference to the flowchart of FIG. 5, the following describes a character/ball control process 2 executed in the tennis game process (S18). This character/ball control process 2 is a process executed in cases where the VS-CPU mode (S12) is set in the tennis game process. Note that the description overlapping with that of the character/ball control process 1 is omitted.

First, the CPU 11 detects an operation input from the controller 20 (S50), as in step S30. Next, based on the operation input detected in step S50, the CPU 11 controls the position, the direction, and the motion (posture) of the operation character 70, as in step S31 (S51).

Next, the CPU 11 controls the position, the direction, and the motion (posture) of the opponent character 73, as in step S34 (S52). Since this process is executed in the VS-CPU mode, the opponent character 73 is automatically moved by the CPU 11. This causes the opponent character 73 to move or make the motion of swinging the racket 74. Further, the CPU 11 controls the position of the tennis ball 72 as in step S35 (S53).

Next, the CPU 11 determines whether the tennis ball 72 hit back by the operation character 70 or the opponent character 73 reached the game background image 63 displayed as a two-dimensional surface in the middle of the tennis court 61 (S54), as in step S36.

When it is determined that the tennis ball 72 did not reach the game background image 63 (S54: NO), the CPU ends the process. On the other hand, when it is determined that the tennis ball 72 reached the game background image 63 (S54: YES), the CPU 11 determines whether the tennis ball 72 came from the side of the operation character 70 to the game background image 63, based on the moving direction of the tennis ball 72 at the time of reaching the game background image 63 (S55), as in step S37.

When it is determined that the tennis ball 72 came from the side of the operation character 70 to the game background image 63 (S55: YES), the CPU 11 executes a process of raising the transparency of the game background image 63 (S56), as in step S38. The process ends after step S56.

On the other hand, when it is determined that the tennis ball 72 did not reach from the side of the operation character 70 to the game background image 63 (S55: NO), i.e., when it is determined that the tennis ball 72 reaches from the side of the opponent character 73 to the game background image 63, the CPU 11 executes a process of lowering the transparency of the game background image 63 (S57), as in step S39. The process ends after step S57.

(Item/Score Process)

Figure 6:
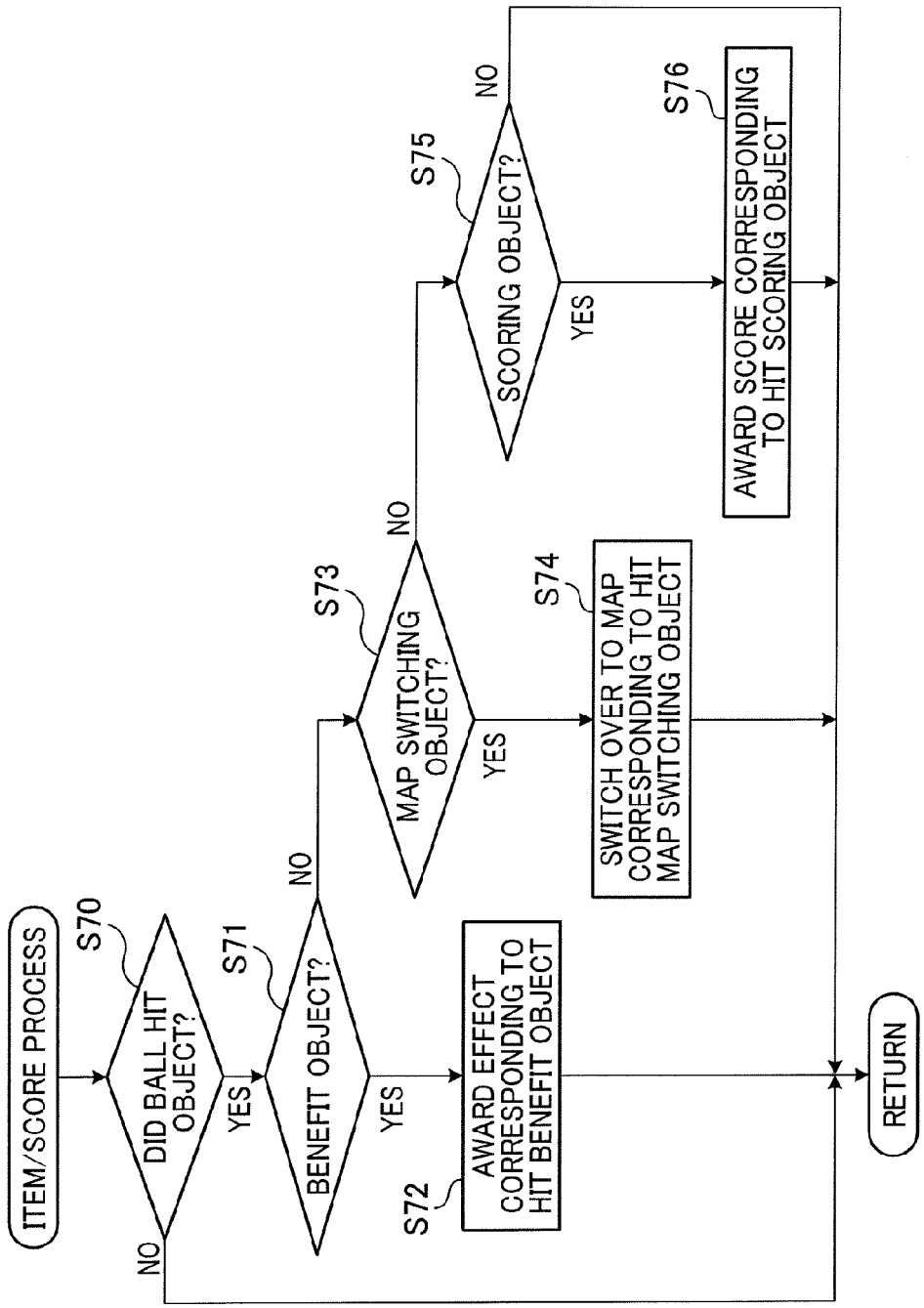
FIG. 6 shows an example non-limiting flowchart of an item/score process related to the present embodiment

Next, with reference to the flowchart of FIG. 6, the following describes an item/score process executed in the tennis game process (S19). In the item/score process (S19), the CPU 11 functions as an effect processor.

First, the CPU 11 determines whether the tennis ball 72 hit back by the operation character 70 or the opponent character 73 hit a surface object arranged in the game background image 63 (S70). When it is determined that the tennis ball 72 did not hit the surface object (S70: NO), the CPU 11 ends the process.

On the other hand, when it is determined that the tennis ball 72 hit the surface object (S70: YES), the CPU 11 determines whether the surface object hit by the tennis ball 72 is a benefit object 68 (S71). When the surface object is a benefit object 68 (S71: YES), the CPU 11 awards an effect corresponding to the hit benefit object (S72). For example, when the hit benefit object 68 is a mushroom 68A, the area of influence 71A (collision determination area) where the tennis ball 72 is determined as to hit the surface object is expanded and becomes a powered-up area of influence 71B, as shown in FIG. 10. In this case, if the player hit the tennis ball 72 against a single surface object, a surface object nearby the hit surface object is also regarded as to be hit, and the chances for various benefits are increased.

On the other hand, when the surface object hit by the tennis ball 72 is not a benefit object 68 (S71: NO), the CPU 11 determines whether the surface object hit by the tennis ball 72 is a map switching object 69 (S73). If it is a map switching object 69 (S73: YES), the CPU 11 switches the map to a map corresponding to the map switching object 69 (pea plant 69A, earthen pipe 69B), i.e., the CPU 11 executes the above-described switching over of the map (S74). Examples of maps in the present embodiment are: a ground map 63A which is a game background image 63A shown in the middle of FIG. 11 having the ground, mountains, bushes, and clouds and with various surface objects therein; a sky map 63B which is a game background image 63B shown in the upper part of FIG. 11 including various surface objects to render an image of the sky scene; and an underground map 63C which is a game background image 63C shown in the lower part of FIG. 11 including various surface objects to render an image of the underground scene.

For example, when the tennis ball 72 hits a pea plant 69A in the ground map of FIG. 11, the map switches over from the ground map to the sky map. Further, when the tennis ball 72 hits an earthen pipe 69B in the ground map of FIG. 11, the map switches over from the ground map to the underground map. This process ends after step S74.

On the other hand, if the surface object hit by the tennis ball 72 is not a map switching object 69 (S73: NO), the CPU 11 determines whether the surface object hit by the tennis ball 72 is a scoring object (S75). If the surface object is a scoring object (S75: YES), the CPU 11 awards a score corresponding to the scoring object (S76). For example, when the hit scoring object is a coin 65, the coin 65 is counted as an earned coin count in the coin counter of the main memory 12, and is displayed on the display device 18 as the earned coin count 90 (see FIG. 7).

On the other hand, if the surface object hit by the tennis ball 72 is not a scoring object (S75: NO), the CPU 11 ends the process.

With the structure described above, it is possible to set the game background image 63 with surface objects arranged therein in the middle of the tennis court 61 within a virtual space 60 for executing a tennis game containing the motion of hitting the tennis ball 72 in response to an operation by the player, and move the surface objects arranged in the game background image 63. For example, based on the surface object arranged in a position of the game background image 63, where the tennis ball 72 hit in response to a player-operation has reached, an effect corresponding to the hit benefit object 68, the hit map switching object 69, or the hit scoring object is awarded to the player. Thus, the player of the tennis game is able to enjoy an additional game element which is to aim at a predetermined effect awarded by the moving surface object arranged in the game background image 63 while playing the tennis game within the virtual space 60.

Further, with the above structure, it is possible to arrange a game background image 63 between the player and the opponent during a game within the tennis court 61 in the virtual space 60, the background image 63 having surface objects arranged therein and letting the tennis ball 72 pass therethrough. This enables the player to enjoy the tennis game in which the player and the opponent hit the tennis ball 72 against each other over the game background image 63 with the moving surface objects arranged therein.

Further, in the above structure, the transparency of the game background image 63 while the tennis ball 72 is in the tennis court 61 on the side of the opponent character 73 can be made higher than that while the tennis ball 72 is in the tennis court 61 on the side of the operation character 70. Since this enables the player of the tennis game to grasp the movement of the opponent character 73 or the position of the tennis ball 72 through the game background image 63 with an increased transparency while the tennis ball 72 is in the tennis court 61 on the side of the opponent character 73, the player is able to smoothly conduct the next operation.

Further, with the above structure, a ball game executed in a virtual space 60 is enjoyed as a tennis game. Specifically, the tennis ball 72 serves as the ball, the racket 71 serves as a tool for hitting the tennis ball 72 in response to a player-operation, the tennis court 61 serves as the court, and the game background image 63 is arranged nearby the net.

Further, with the structure, when a surface object arranged in a position of the game background image 63 where the tennis ball 72 reached is an item object such as a benefit object 68 (mushroom 68A, mushroom 68B), a map switching object 69 (pea plant 69A, earthen pipe 69B), or a scoring object (coin 65 or the like), the player is able to obtain an effect or a score corresponding to the item object. This provides various developments of the game by awarding the player various benefits based on the item object or the score obtained by the player.

Further, in the structure, the map is switched over to another map when the surface object arranged in a position of the game background image 63 where the tennis ball 72 reached is a map switching object 69 (pea plant 69A, earthen pipe 69B). This enables the player to enjoy the tennis game with various maps.

Further, with the structure, the surface objects arranged in the game background image 63 are scrolled over time. Thus, the player is able to hit the tennis ball 72, aiming at the surface objects successively supplied by scrolling. In other words, new surface objects are always provided to the player.

(Modification: Wall-Hitting Tennis Game)

Next, the following describes a modification of the present embodiment. The present embodiment deals with a case where the operation character 70 competes against the opponent character 73. This modification on the other hand executes a wall-hitting tennis game in which the operation character 70 plays alone, assuming the game background image 63 with surface objects arranged therein as a wall. This wall-hitting tennis game process is described below with reference to FIG. 12 to FIG. 14. Note that the description overlapping with that of the above-described tennis game process is omitted or simplified.

(Wall-Hitting Tennis Game Process)

Figure 12:
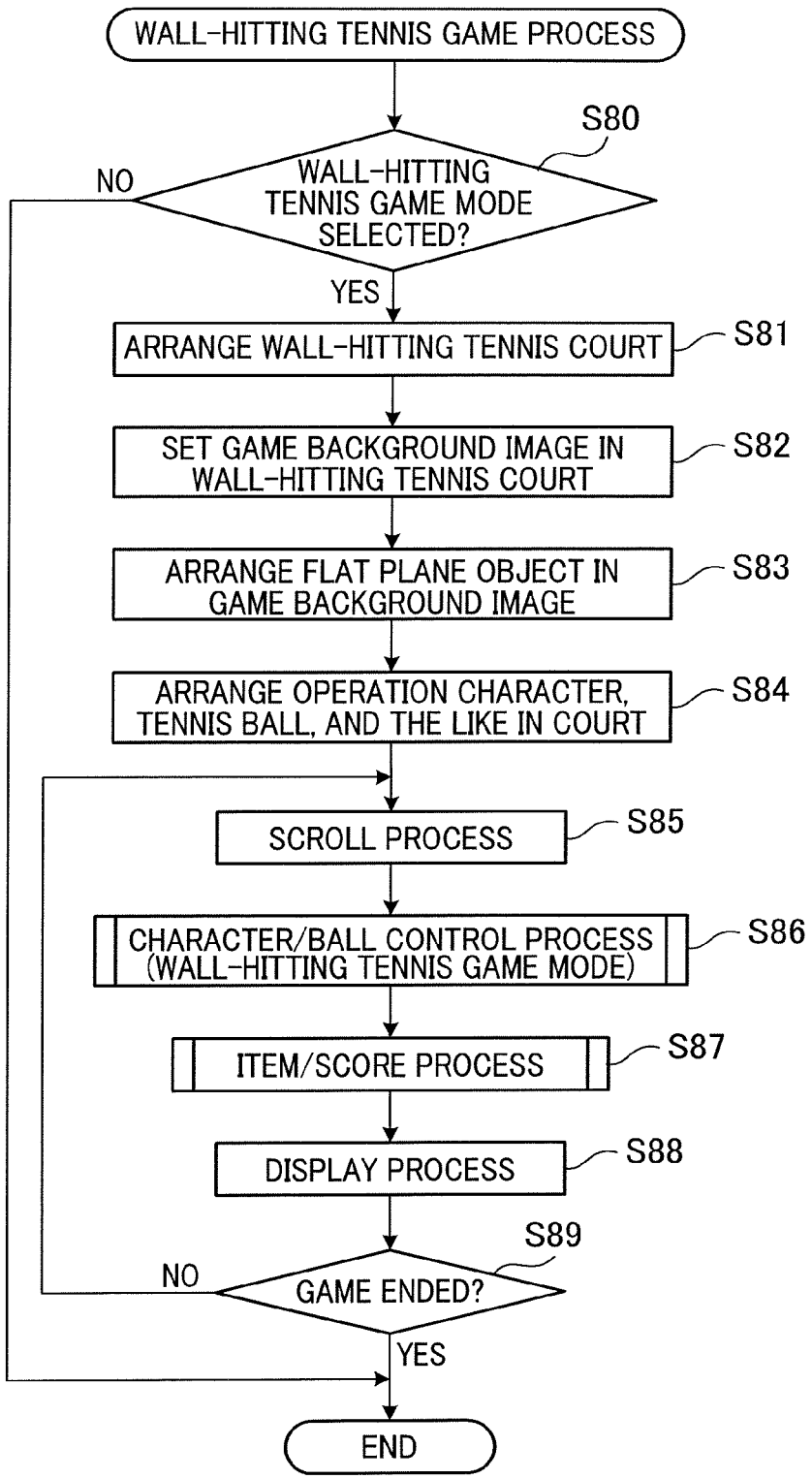
FIG. 12 shows an example non-limiting flowchart of a wall-hitting tennis game process related to the present embodiment.
Figure 13:
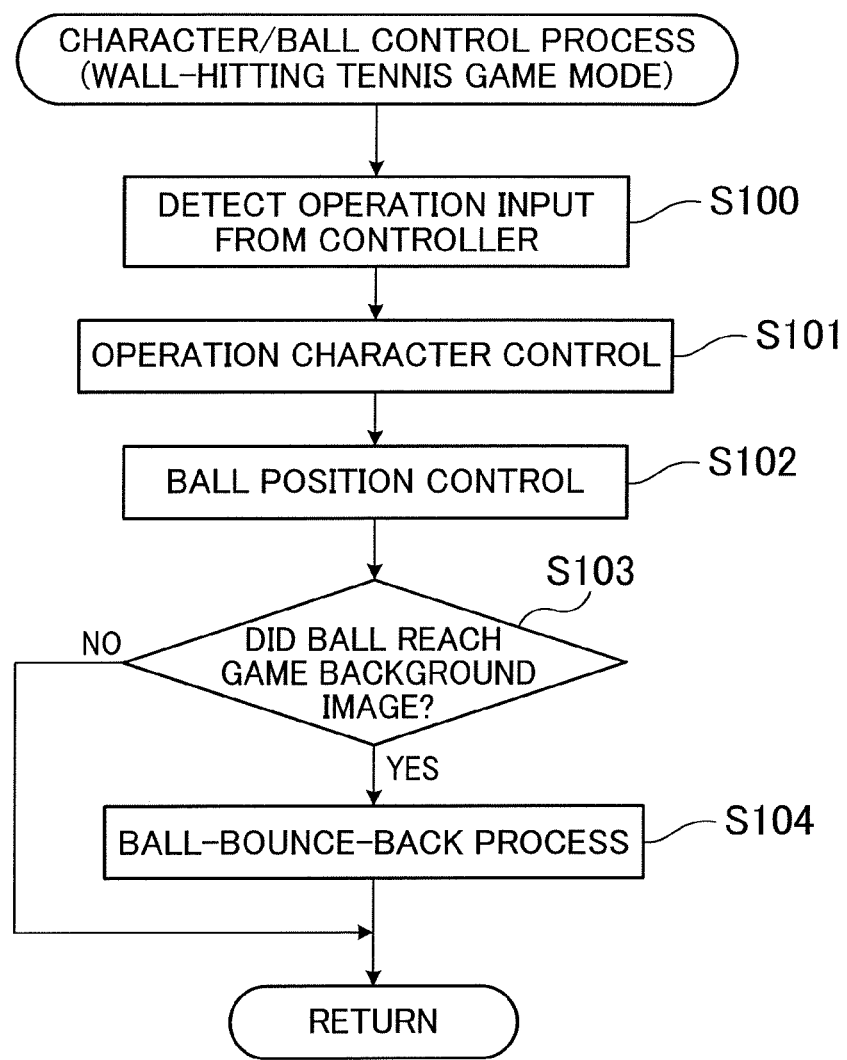
FIG. 13 shows an example non-limiting flowchart of a character/ball control process in a wall-hitting tennis game mode related to the present embodiment.

As shown in FIG. 12, although the wall-hitting tennis game process include the similar steps as those of the above-described tennis game process, the wall-hitting tennis game process starts when the player of the game device 10 selects the wall-hitting tennis game mode, instead of steps S10 to S12. Specifically, when the wall-hitting tennis game process starts, a wall-hitting tennis game program is run to cause the CPU 11 to execute the following steps. First, the CPU 11 determines whether the player of the game device 10 selected the wall-hitting tennis game mode by an operation input through the controller 20 (S80). When it is determined that the wall-hitting tennis game mode is not selected (S80: NO), the CPU 11 ends the process.

Figure 14:
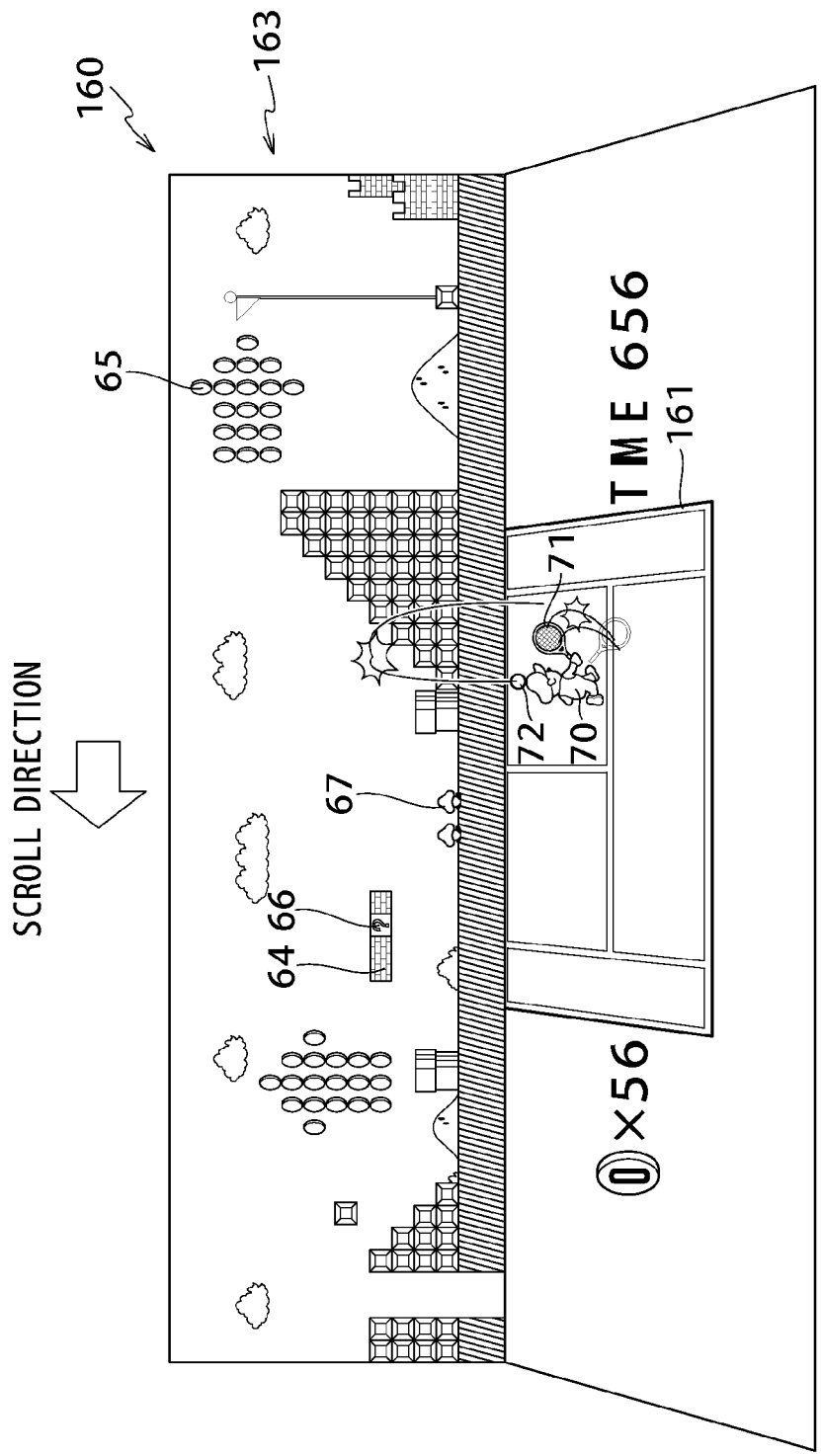
FIG. 14 shows an example non-limiting diagram of a game image in the wall-hitting tennis game mode.

On the other hand, when it is determined that the wall-hitting tennis game mode is selected (S80: YES), the CPU 11 arranges a wall-hitting tennis court 161 in a virtual space 160 as shown in FIG. 14 (S81).

Next, the CPU 11 arranges a wall object 59 in the wall-hitting tennis court 161, and sets a game background image 63 (corresponding to the surface) on this wall object 59 (S82).

Next, the CPU 11 arranges within the game background image 163 various types of surface objects (bricks 64, coins 65, item closed box baffles 66, monsters 67, and the like) (S83).

Next, the CPU 11 arranges in the wall-hitting tennis court 161 an operation character 70 operated by the player, a tennis ball 72, a racket 71, and the like (S84).

After step S84, steps S85 to S89 are looped. In this loop of steps S85 to S89, the operation character 70 moves and hit the tennis ball 72 to progress the tennis game, in response to operations by the player.

In the loop of steps S85 to S89, the CPU 11 first executes the above-described scroll process (S85). Next, the CPU 11 executes a character/ball control process of the wall-hitting tennis game mode shown in the flowchart of FIG. 13 (S86). Specifically, the CPU 11 detects an operation input from the controller 20 (S100). Next, based on the operation input detected in step S100, the CPU 11 executes motion control of the operation character (S101), as in step S31. The CPU 11 further controls the position of the tennis ball 72 (S102), as in step S35.

Next, the CPU 11 determines whether the tennis ball hit by the operation character 70 reached the game background image 163 arranged in the wall-hitting tennis court 161 (S103).

When it is determined that the tennis ball 72 did not reach the game background image 163 (S103: NO), the CPU 11 ends the process. On the other hand, when it is determined that the tennis ball 72 reached the game background image 163 (S103: YES), the CPU 11 executes a ball-bounce-back process (S104). In the ball-bounce-back process, the game background image 163 serves as a surface on which the tennis ball 72 is bounced back, and a motion process is executed to bounce back the tennis ball 72 based on the moving direction and the speed of the tennis ball 72, when the tennis ball 72 reaches the game background image 163 (see FIG. 14). The process ends after step S104. Note that step S104 executed by the CPU 11 corresponds to a bounce-back processor.

After the character/ball control process of the wall-hitting tennis game mode, an item/score process is executed as in step S19 (S87).

Next, a game image is generated according to the result of steps S85 to S87 and is displayed on the display device 18 (S88).

Next, the CPU 11 determines whether the game is ended (S89). When it is determined that the game is not ended (S89: NO), the process returns to S85, and the loop of steps S85 to S89 is resumed.

On the other hand, when it is determined that the game is ended (S89: YES), the CPU 11 ends the wall-hitting tennis game process.

In the above structure, when the tennis ball 72 reaches the game background image 163 having surface objects arranged therein in the tennis game within the virtual space 160, the tennis ball 72 is bounced back. Since the tennis ball 72 having reached the surface after being hit by a player-operation bounces back on the surface, the player needs to repetitively hit the tennis ball 72, which consequently provides enjoyment of the wall-hitting tennis game.

(Alternative Embodiment)

The present embodiment deals with a case adopting tennis game as the ball game; however, the ball game may be squash, volleyball, beach volleyball, table tennis, or the like. Further, the present embodiment deals with a case where the game device 10 is portable; however, the game device 10 may be a stationary game device which is connected to a TV monitor when used. For example, the technology herein may include one or more servers taking at least a part of the process and a client terminal (game device 10) which is connected and in communication with the one or more servers. Alternatively, the technology herein may be a distributed system including a plurality of game devices 10 connected to each other directly or via a network, each of which devices takes a part in the process.

In the present embodiment, the surface objects are scrolled on the surface of the wall object 59; however, the technology herein is not limited to a structure of scrolling the surface objects as long as the surface objects are moved. In other words, the position of the surface objects may be changed by a method other than scrolling. Further, it is possible to keep the surface objects in the same positions and change the posture (motion), without changes in the positions.

In the present embodiment, the surface objects are arranged on the wall object 59 (two-dimensional virtual space is set within a three-dimensional virtual space); however, the technology herein is not limited to such a structure, and it is possible to arrange another three-dimensional virtual space within a predetermined area of the three-dimensional virtual space.

Further, the above embodiment may be paraphrased and redefined as a game system configured to perform a tennis game (game) within a virtual space 60 (first virtual space), in which system the tennis ball 72 (operation target) is controlled (target processor) within the virtual space 60 in response to a player-operation, a wall object 59 (screen area) is set in the middle (predetermined position) of the tennis court 61 within the virtual space 60 (screen setting component), a game background image 63 (second virtual space) which is different from the virtual space 60 is set (second virtual space setting component), a part of the game background image 63 is movably displayed on the wall object 59 (second virtual space drawing component), and a predetermined effect is given in the tennis game, based on the position in the game background image 63, the position corresponding to the position of the tennis ball 72 at the point when the tennis ball 72 moving within the virtual space 60 reaches the wall object 59 (effect processor).

The detailed description above is mainly focused on characteristics of the technology for the sake of easier understanding. However, the technology is not limited to the disclosure of the detailed description above and the range of application thereof should be interpreted as broadly as possible. Further, the terms and phraseology used in the application are adopted solely to provide specific illustration of the technology, and in no case should the scope of the technology be limited by such terms and phraseology. Further, it will be obvious for those skilled in the art that other structures, systems, methods, programs, or the like are possible, within the spirit of the technology described in the application. The description of claims therefore shall encompass equivalent structures, unless otherwise such structures are regarded as to depart from the spirit and scope of the technology. To fully understand the object and effects of the technology, it is strongly encouraged to sufficiently refer to disclosures of documents already made available.

What is claimed is:

1. A game system including a display device and a player operation inputting device, the game system configured to perform video game processing to execute and display a virtual ball game which takes place within a virtual space, comprising:

one or more processors configured to interact with a user providing inputs via an operation inputting device and perform game processing to execute and display the virtual ball game which takes place within a virtual space, said one or more processors configured to perform functions and operate as:

a virtual ball movement processor which performs a game process wherein a virtual ball is moved within the virtual space in response to a hitting operation performed by a player using the operation inputting device;

a virtual object setter configured to set a virtual three-dimensional object at a predetermined position in the virtual space, the virtual three-dimensional object having a surface where a virtual ball hit during the game process can reach;

a virtual object surface image arranger configured to make one or more object surface images appear upon the surface of the virtual three-dimensional object;

a virtual object surface image movement processor configured to move, within the surface of the virtual three-dimensional object, the one or more object surface images made to appear upon the surface of the virtual three-dimensional object;

an effect processor configured to provide a predetermined effect in the game process, based on a condition that at least one of the object surface images made to appear upon the surface of the virtual three-dimensional object are present at a contact position of the virtual ball with a point on the surface of the virtual three-dimensional object, when a hit virtual ball reaches the surface of the virtual three-dimensional object; and a display processor configured to display the virtual space and the virtual ball game on the display device.

2. The game system according to claim 1, further comprising a bounce-back processor configured to execute a process of bouncing back the virtual ball when the virtual ball reaches the surface of the virtual three-dimensional object.

3. The game system according to claim 1, wherein:
the virtual ball game enables a player to compete against an opponent within a court in the virtual space; and
the virtual three-dimensional object is a plane set in the middle of the court and is capable of letting the virtual ball pass therethrough.

4. The game system according to claim 3, further comprising a transparency processor configured to raise the transparency of at least a part of the surface of the virtual three-dimensional object when the virtual ball is within a court on a side of the opponent.

5. The game system according to claim 1, wherein the virtual ball game is a tennis game.

6. The game system according to claim 1, wherein the effect processor executes a process of awarding the player an item and/or a process of awarding the player a score, when at least one of the one or more object surface images appearing at a position within the surface of the virtual three-dimensional object where the virtual ball reaches is an image of a predetermined item object.

7. The game system according to claim 1, further comprising a plurality of maps which include one or more of the object surface images,
wherein the effect processor switches over at least one of the plurality of maps to another one of the plurality of maps when at least one of the object surface images appearing at a position where the virtual ball has reached is a predetermined type of object surface image.

8. The game system according to claim 1, wherein the object processor scrolls over time at least one of the one or more object surface images within the surface of the virtual three-dimensional object.

9. A game system including a display and a player operation inputting device and one or more processing components configured to perform game processing to execute and display a game which takes place within a first virtual space, the system comprising:
a target processing component configured to control movement of an operation target within the first virtual space based on an operation by a user using the operation inputting device;
a screen setting component configured to set a screen area in a predetermined position within the first virtual space, the screen area to be used for displaying an image;
a second virtual space setting component configured to create a second virtual space which is distinct from the first virtual space;
a second virtual space image displaying component configured to produce an image of a part of the second virtual space and display the image of the part of the second virtual space upon the set screen area while changing the part of the second virtual space which is being displayed upon the set screen area; and
an effect processor configured to provide a predetermined effect in the game based on a condition that the position of the operation target is in correspondence at a point on the set screen area with an image of one or more objects which may be present in the displayed part of the second virtual space when the operation target is moved within the first virtual space.

10. A video game operation method for conducting and controlling video game processing on an information processing system to execute and display a virtual ball game which takes place within a virtual space, the information processing system including one or more processors configured to perform game processing and to interact with a user providing inputs via an operation inputting device, and including a user interface having at least a display and an operation inputting device, the method comprising:
using the information processing system to perform a virtual ball game process wherein a virtual ball is moved within in the virtual space in response to a hitting operation performed by a player using the operation inputting device;
setting a virtual three-dimensional object at a predetermined position in the virtual space, the virtual three-dimensional object having a surface where a virtual ball hit during the game process can reach;
making one or more object surface images appear upon the surface of the virtual three-dimensional object;
moving, within the surface of the virtual three-dimensional object, the one or more object surface images made to appear upon the surface of the virtual three-dimensional object;
using the information processing system to produce a predetermined effect in the game process, based on a condition that at least one of the object surface images made to appear upon on the surface of the virtual three-dimensional object is present at a contact position of the virtual ball with a point on the surface of the virtual three-dimensional object, when a hit virtual ball reaches the surface of the virtual three-dimensional object; and
displaying the virtual space and the virtual ball game on the display.

11. The method according to claim 10, further comprising executing a process of bouncing back the virtual ball when the virtual ball reaches the surface of the virtual three-dimensional object.

12. The method according to claim 10, wherein:
The virtual ball game enables a player to compete against an opponent within a court in the virtual space; and
the virtual three-dimensional object is a plane set in the middle of the court and is capable of letting the virtual ball pass therethrough.

13. The method according to claim 12, further comprising increasing the transparency of at least a part of the surface of the virtual three-dimensional object when the virtual ball is within a court on a side of the opponent.

14. The method according to claim 10, wherein the virtual ball game is a tennis game.

15. The method according to claim 10, wherein producing a predetermined effect in the virtual ball game further includes performing a process of awarding the player an item and/or a process of awarding the player a score when at least one of the one or more object surface images appearing within the virtual three-dimensional object surface and present at a contact position where the virtual ball reaches is an image of a predetermined item object.

16. The method according to claim 10, further comprising producing a plurality of maps which include one or more of the object surface images,
wherein, in producing a predetermined effect, at least one of the plurality of maps is switched over to another one of the plurality of maps, when at least one of the object surface images appearing in a position where the virtual ball reached is a predetermined type of object surface image.

17. The method according to claim 10, wherein moving one or more of the object surface images further includes a process of scrolling over time the object surface images within the surface of the virtual three-dimensional object.

18. A display process control method implemented using an information processing system including a display and a user operation inputting device and one or more computer processors configured to perform processing to execute displayable processes which take place within one or more virtual space, the method comprising:
- using the information processing system to control movement of an operation target within a first virtual space based on an input operation performed by a user using the operation inputting device;
- setting a screen area in a predetermined position within the first virtual space, the screen area to be used for displaying an image;
- creating a second virtual space which is distinct from the first virtual space;
- using the processing system to produce an image of a part of the second virtual space and display the image of a part of the second virtual space upon the set screen area while changing the part of the second virtual space which is being displayed upon the set screen area; and
- using the processing system to provide a predetermined effect based on a condition that the position of the operation target is in correspondence at a point on the set screen area with an image of one or more objects which may be present in the displayed part of the second virtual space when the operation target is moved within the first virtual space.

19. An apparatus for playing a game using a display device and a player operation inputting device, the apparatus having one or more processors configured to perform video game processing to execute and display a virtual ball game which takes place within a virtual space, said one or more processors configured to perform functions and operate as:
- a virtual ball movement processor which performs a game process wherein a ball is moved within the virtual space in response to a hitting operation performed by a player using the operation inputting device;
- a virtual object setter configured to set a virtual three-dimensional object at a predetermined position in the virtual space, the virtual three-dimensional object having a surface where a virtual ball hit during the game process can reach;
- a virtual object surface image arranger configured to make one or more object surface images appear upon the surface of the virtual three-dimensional object;
- a virtual object surface image movement processor configured to move, within the surface of the virtual three-dimensional object, the one or more object surface images made to appear upon the surface of the virtual three-dimensional object;
- an effect processor configured to provide a predetermined effect in the game process, based on a condition that at least one of the object surface images made to appear upon the surface of the virtual three-dimensional object are present at a contact position of the virtual ball with a point on the surface of the virtual three-dimensional object, when a hit virtual ball reaches the surface of the virtual three-dimensional object; and
- a display processor configured to display the virtual space and the virtual ball game on the display device.

20. The apparatus according to claim 19, wherein said one or more processors is configured to perform functions and operate as a bounce-back processor configured to execute a process of bouncing back the virtual ball when the virtual ball reaches the surface of the virtual three-dimensional object.

21. The apparatus according to claim 19, wherein:
the virtual ball game enables a player to compete against an opponent within a court in the virtual space; and
the virtual three-dimensional object is a plane set in the middle of the court and is capable of letting the virtual ball pass therethrough.

22. A non-transitory storage medium storing a game program which when executed by a computer causes the computer to interact with a user and perform game program processing using a display and a player operation inputting device to execute and display a virtual ball game which takes place within a virtual space, the game program causing the computer to function and perform operations as:
- a virtual ball movement processor which performs a game process wherein a virtual ball is moved within the virtual space in response to a hitting operation performed by a player using the operation inputting device;
- a virtual object setter configured to set a virtual three-dimensional object at a predetermined position in the virtual space, the virtual three-dimensional object having a surface where a virtual ball hit during the game process can reach;
- a virtual object surface image object arranger configured to make one or more object surface images appear upon the surface of the virtual three-dimensional object;
- a virtual object surface image movement processor configured to move, within the surface of the virtual three-dimensional object, the one or more object surface images made to appear upon the surface of the virtual three-dimensional object;
- an effect processor configured to provide a predetermined effect in the game process, based on a condition that at least one of the object surface images made to appear upon the surface of the virtual three-dimensional object are present at a contact position of the ball with a point on the surface of the virtual three-dimensional object, when a hit virtual ball reaches the surface of the virtual three-dimensional object; and
- a display processor configured to display the virtual space and the virtual ball game on the display device.

23. The non-transitory storage medium according to claim 22, wherein the game program causes the computer to function and perform operations as a bounce-back processor configured to execute a process of bouncing back the virtual ball when the virtual ball reaches the virtual object surface.

24. The non-transitory storage medium according to claim 22, wherein the virtual ball game enables a player to compete against an opponent within a court in the virtual space; and
the virtual three-dimensional object is a plane set in the middle of the court and is capable of letting the virtual ball pass therethrough.

* * * * *